United States Patent
Stefani et al.

(10) Patent No.: US 11,746,870 B1
(45) Date of Patent: Sep. 5, 2023

(54) METHOD OF CONTROLLING A DIFFERENTIAL LOCK

(71) Applicant: ArvinMeritor Technology, LLC, Troy, MI (US)

(72) Inventors: Armando Marcelo Rivero de Stefani, Osasco (BR); Adriano Esperidião, Osasco (BR); Egidio Correa, Osasco (BR); Fabio Rocha Brandão, Osasco (BR); Rodrigo Ramos Barbosa, Osasco (BR)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/949,314

(22) Filed: Sep. 21, 2022

(51) Int. Cl.
  *F16H 48/20* (2012.01)
  *B60K 23/04* (2006.01)
  *B60W 50/00* (2006.01)
  *F16H 61/04* (2006.01)
  *B60K 23/08* (2006.01)

(52) U.S. Cl.
  CPC ........ *F16H 48/20* (2013.01); *B60K 2023/046* (2013.01); *B60K 2023/0841* (2013.01); *B60W 2050/0021* (2013.01); *B60W 2050/0026* (2013.01); *F16H 2048/204* (2013.01); *F16H 2061/0459* (2013.01)

(58) Field of Classification Search
  CPC .............. F16H 48/20; F16H 2048/204; F16H 2061/0459; B60W 2050/0026; B60W 2050/0021; B60K 2023/0841
  See application file for complete search history.

(56) References Cited

U.S. PATENT DOCUMENTS

| | | | | |
|---|---|---|---|---|
| 7,770,681 | B2 * | 8/2010 | Marathe | B60K 28/165 |
| | | | | 180/197 |
| 8,504,254 | B2 * | 8/2013 | Uematsu | F02D 29/02 |
| | | | | 303/151 |
| 8,944,952 | B2 | 2/2015 | Hayes et al. | |
| 9,162,569 | B2 | 10/2015 | Dean | |
| 9,885,408 | B2 | 2/2018 | Bionaz et al. | |
| 9,903,457 | B2 | 2/2018 | Tiziani et al. | |
| 9,994,104 | B2 * | 6/2018 | Hertel | E02F 3/84 |
| 10,352,424 | B2 * | 7/2019 | Chu | F16H 48/36 |
| 10,907,715 | B2 * | 2/2021 | Chu | B60W 30/045 |
| 11,148,529 | B1 * | 10/2021 | Willford | B60K 17/36 |
| 2007/0199404 | A1 | 8/2007 | Mason | |
| 2008/0255735 | A1 * | 10/2008 | Marathe | E02F 9/2037 |
| | | | | 701/88 |
| 2020/0376958 | A1 * | 12/2020 | Ono | B60K 17/348 |

* cited by examiner

Primary Examiner — Tinh Dang
(74) Attorney, Agent, or Firm — Brooks Kushman PC

(57) ABSTRACT

A method of controlling a differential lock. The differential lock is actuated to lock a differential assembly when wheel slip of a first wheel assembly is detected and a duration of the wheel slip exceeds a pre-activation buffer. The pre-activation buffer is based on acceleration of the first wheel assembly and vehicle speed.

19 Claims, 3 Drawing Sheets

METHOD OF CONTROLLING A DIFFERENTIAL LOCK

TECHNICAL FIELD

This relates to a system and method of controlling a differential lock that locks and unlocks a differential assembly that may be provided with an axle assembly of a vehicle.

BACKGROUND

A method of controlling a differential lock is disclosed in U.S. Pat. No. 9,162,569.

SUMMARY

In at least one embodiment a method of controlling a differential lock is provided. The method includes actuating the differential lock to lock a differential assembly when wheel slip of a first wheel assembly is detected and a duration of the wheel slip exceeds a pre-activation buffer. The pre-activation buffer is based on acceleration of the first wheel assembly and vehicle speed.

Wheel slip of the first wheel assembly may be detected by comparing a rotational speed of the first wheel assembly to a rotational speed of a second wheel assembly. Wheel slip of the first wheel assembly may be present when the rotational speed of the first wheel assembly is at least twice the rotational speed of the second wheel assembly. The differential lock may not be actuated to lock the differential assembly when wheel slip is not detected.

The pre-activation buffer may be determined after wheel slip of the first wheel assembly is detected. The pre-activation buffer may delay actuation of the differential lock to lock the differential assembly. A delay provided by the pre-activation buffer may decrease as acceleration of the first wheel assembly increases and wheel speed increases.

The differential lock may not be actuated to lock the differential assembly when wheel speed of the first wheel assembly has been monitored for a first predetermined period of time and the duration of the wheel slip does not exceed the pre-activation buffer.

The method may include determining a differential lock engagement buffer when the duration of the wheel slip exceeds the pre-activation buffer. The differential lock engagement buffer may be based on vehicle speed, acceleration of the first wheel assembly, or both. The differential lock engagement buffer may delay actuation of the differential lock to lock the differential assembly. The delay provided by the differential lock engagement buffer may increase as vehicle speed increases, as acceleration of the first wheel assembly increases, or both.

Actuating the differential lock may include actuating the differential lock to lock the differential assembly when an amount of time that rotational speeds of the first wheel assembly and a second wheel assembly are in the differential lock engagement range exceeds the differential lock engagement buffer.

The differential lock is not actuated to lock the differential assembly when wheel speed of the first wheel assembly has been monitored for a second predetermined period of time and the amount of time that the rotational speed of the first wheel assembly and the second wheel assembly are in the differential lock engagement range does not exceed the differential lock engagement buffer.

The method may include disengaging the differential lock. The differential lock may be disengaged when the vehicle speed exceeds a predetermined speed for a first period of time. The differential lock may be disengaged when the vehicle speed is zero for a second period of time. The first period of time may differ from the second period of time. The first period of time may be less than the second period of time.

The method may include not disengaging the differential lock when the vehicle speed does not exceed a predetermined speed for the first period of time and the vehicle speed is zero for the second period of time.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a" and "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
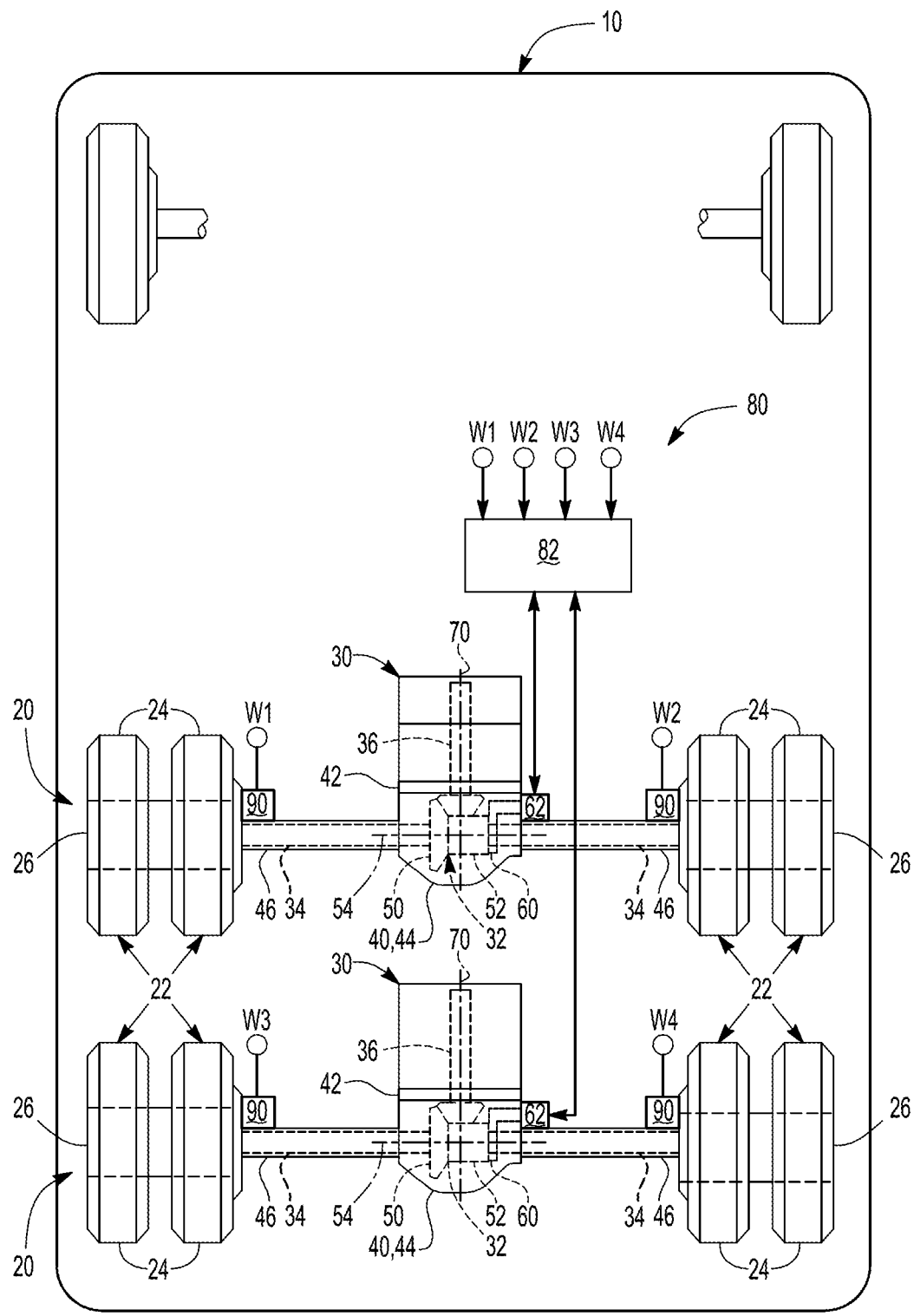
FIG. 1 is a schematic representation of an example of a vehicle having a differential assembly and a differential lock.

Referring to FIG. 1, an example of a vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments.

The vehicle 10 includes one or more axle assemblies 20, such as a front axle assembly and a rear axle assembly. The axle assemblies 20 are illustrated as drive axle assemblies. A drive axle assembly may be configured to provide torque to wheel assemblies 22 that may be rotatably supported on the axle assembly 20. A wheel assembly 22 may include a tire 24 disposed on a wheel 26. An axle assembly 20 may be driven using any suitable power source or torque source, such as an internal combustion engine, an electric motor, or combinations thereof.

The axle assembly 20 may have any suitable configuration. In the example shown, the axle assembly 20 is illustrated as including a housing assembly 30, a differential assembly 32, a pair or axle shafts 34, and a drive pinion 36.

The housing assembly 30 receives various components of the axle assembly 20. In addition, the housing assembly 30 may facilitate mounting of the axle assembly 20 to the vehicle 10. In at least one configuration, the housing assembly 30 may include an axle housing 40 and a differential carrier 42.

The axle housing 40 may receive and support the axle shafts 34. In at least one configuration, the axle housing 40 may include a center portion 44 and at least one arm portion 46.

The center portion 44 may be disposed proximate the center of the axle housing 40. The center portion 44 may define a cavity that may receive the differential assembly 32.

One or more arm portions 46 may extend from the center portion 44. For example, two arm portions 46 may extend in opposite directions from the center portion 44 and away from the differential assembly 32. The arm portions 46 may each have a hollow configuration or tubular configuration that may extend around and may receive a corresponding axle shaft 34 and may help separate or isolate the axle shaft 34 from the surrounding environment. A wheel hub may be rotatably disposed on an arm portion 46 and operatively connected to an axle shaft 34. A wheel assembly 22 is mountable to the wheel hub.

The differential carrier 42 may be mounted to the center portion 44 of the axle housing 40. The differential assembly 32 may be rotatably supported on the differential carrier 42.

The differential assembly 32 is disposed in the housing assembly 30. For instance, the differential assembly 32 may be disposed in the center portion 44 of the axle housing 40. The differential assembly 32 may transmit torque to the axle shafts 34 of the axle assembly 20 and permit the axle shafts 34 and wheel assemblies 22 to rotate at different velocities when the differential assembly is unlocked in a manner known by those skilled in the art. For example, the differential assembly 32 may have a ring gear 50 that may be fixedly mounted on a differential case 52. The ring gear 50 and the differential case 52 may be rotatable about a differential axis 54. The differential case 52 may receive differential gears that may be operatively connected to the axle shafts 34.

The differential assembly 32 may include or be associated with a differential lock 60. The differential lock 60 may have any suitable configuration, some examples of which are disclosed in U.S. Patent Publication No. 2007/0199404 and U.S. Pat. No. 9,903,457, which are incorporated by reference in their entirety herein. The differential lock 60 is configured to permit the axle shafts 34 to rotate at different speeds when unlocked and is configured to inhibit the axle shafts 34 of the axle assembly 20 from rotating at different speeds when locked. For instance, the differential lock 60 may couple an axle shaft 34 to the differential case 52 so that the axle shaft 34 does not rotate with respect to the differential case 52 when in an engaged or locked position and may not couple an axle shaft 34 to the differential case 52 so that the axle shaft 34 is permitted to rotate with respect to the differential case 52 when in a disengaged or unlocked position.

The differential lock 60 may include or be operatively connected to a differential lock actuator 62. The differential lock actuator is configured to actuate the differential lock 60 between the engaged (locked) and disengaged (unlocked) positions. The axle shafts 34 of the axle assembly 20 may rotate together at a common speed or velocity when the differential lock 60 is in the engaged or locked position, which may help increase traction. The axle shafts 34 of the axle assembly 20 may be permitted to rotate at different speeds or different velocities when the differential lock 60 is in the disengaged or unlocked position. Unlocking of the differential assembly 32 may aid in negotiating a turn and may help reduce tire wear.

The axle shafts 34 are configured to transmit torque between the differential assembly 32 and a corresponding wheel hub. For example, two axle shafts 34 may be provided such that each axle shaft 34 extends through a different arm portion 46 of axle housing 40. The axle shafts 34 may be rotatable about an axis, such as a wheel axis or the differential axis 54.

The drive pinion 36 operatively connects the differential assembly 32 to the power source or torque source. The drive pinion 36 may be received in the housing assembly 30. The drive pinion 36 may be rotatable about an axis, such as the axis 70, and may have a gear portion that has teeth that meshes with teeth of the ring gear 50 of the differential assembly 32. Torque that is provided by the power source or torque source to the drive pinion 36 may be transmitted to the ring gear 50 and thus to the differential assembly 32. A transmission may operatively connect the drive pinion 36 to the power source or torque source in one or more configurations.

The control system 80 controls operation of the axle assembly 20. For example, the control system 80 may include one or more microprocessor-based control modules or controllers 82 that may be electrically connected to or communicate with components of the vehicle 10 and/or the axle assembly 20, such as the differential lock actuator 62. Control system connections are represented by straight arrowed lines in FIG. 1. In addition, the control system 80 may also process input signals or data from various input devices or sensors, such as one or more speed sensors 90.

A speed sensor 90 provides a signal indicative of the rotational speed of a wheel assembly 22. For instance, the speed sensor 90 may provide a signal indicative of the rotational speed or rotational velocity of a wheel assembly 22 and an associated axle shaft 34. In at least one configuration, the speed sensor 90 may be mounted to the axle assembly 20 and may detect rotation of a wheel hub upon which the wheel assembly 22 is mounted and thus may be indicative of wheel speed. Alternatively or in addition, a speed sensor 90 may detect rotation of an axle shaft 34.

A speed sensor 90 may be associated with each wheel assembly 22 or axle shaft 34 of the axle assembly 20. For instance, a speed sensor 90 may be provided with an anti-lock brake system or traction control system. As such, the speed sensor 90 may detect wheel slip or unexpected rotation of a wheel assembly 22 in a manner known by those skilled in the art.

A signal from one or more speed sensors 90 may be indicative of vehicle speed or speed of the vehicle 10. For instance, a signal from a speed sensor that is associated with a non-spinning wheel may be indicative of vehicle speed. It is contemplated that a speed sensor 90 may be associated with a wheel assembly 22 that does not receive propulsion torque (and thus may be less susceptible to slipping), and that the signal from this speed sensor 90 may be indicative of vehicle speed. In FIG. 1, communication between the controller 82 and the speed sensors 90 is represented by connection nodes W1 through W4.

Figure 2:
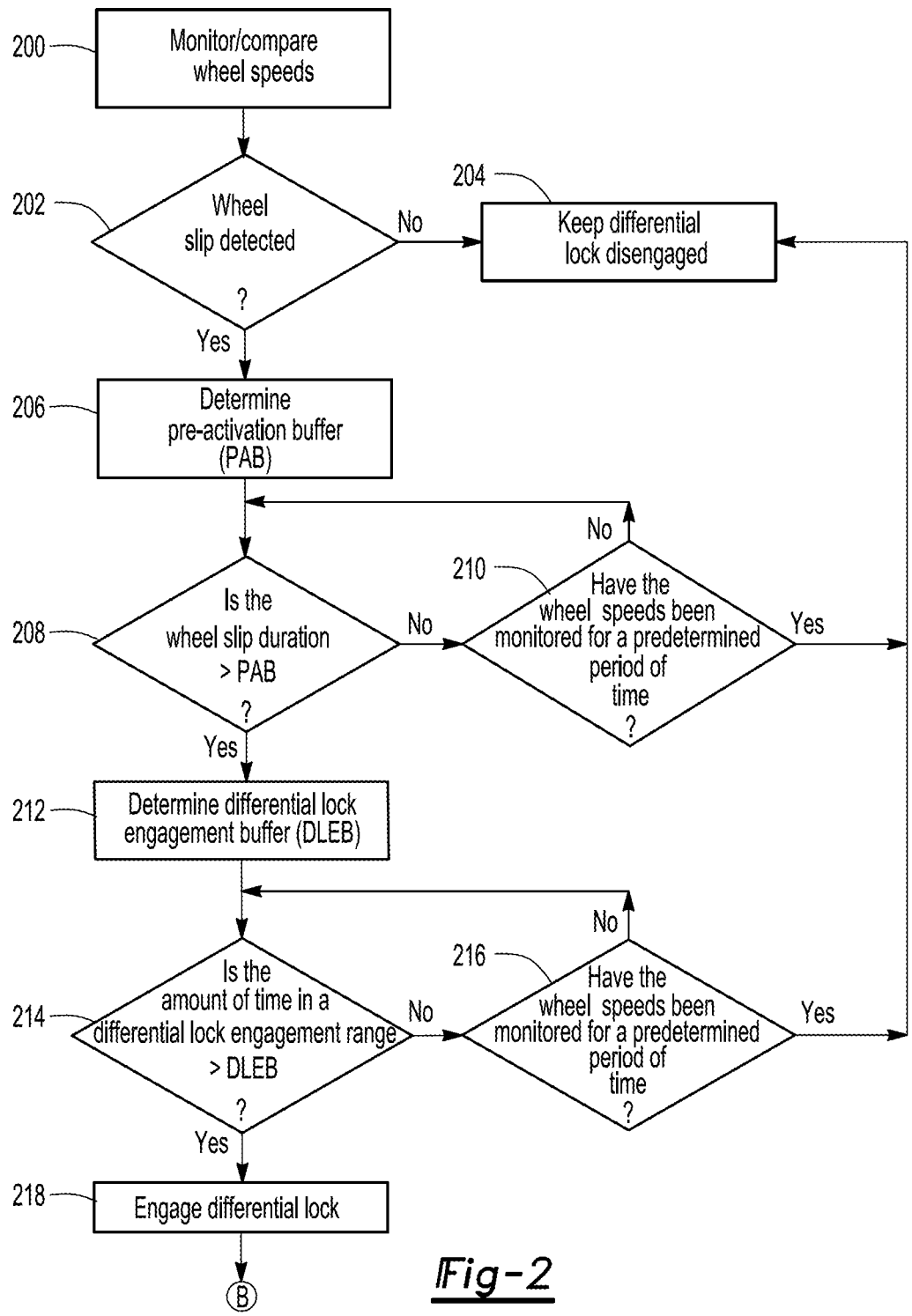
FIG. 2 is a flowchart of a method of controlling the differential lock.
Figure 3:
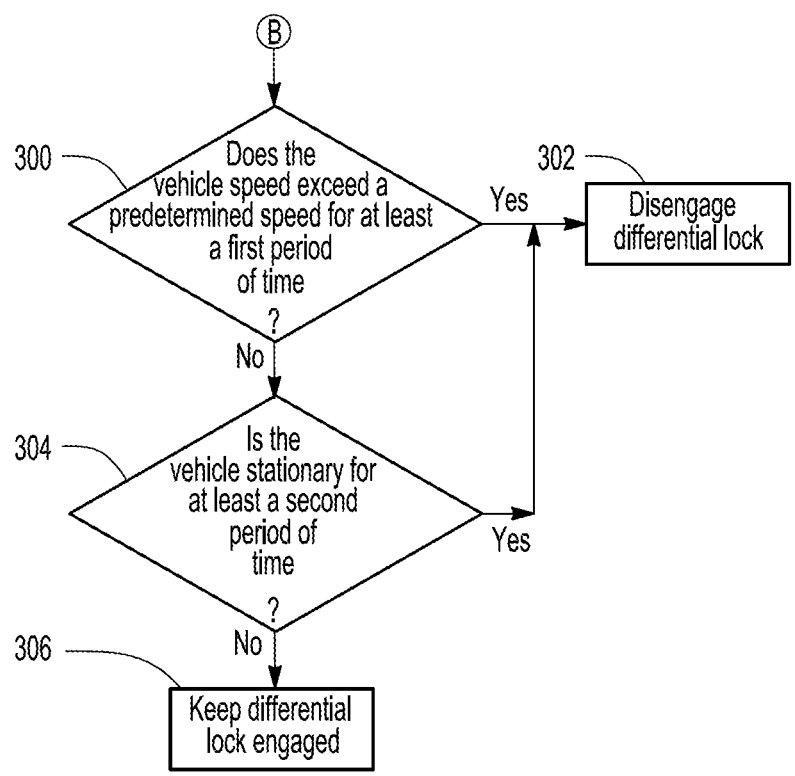
FIG. 3 expands upon the flowchart of FIG. 2.

Referring to FIGS. 2 and 3, flowcharts of a method of controlling a differential lock are shown. As will be appreciated by one of ordinary skill in the art, the flowcharts may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multi-tasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope of the present invention. Method steps may be executed by the control system 80 and may be implemented as a closed loop control system.

As used below, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As an overview, a tire can slip or lose traction with respect to the road or support surface that it engages when propulsion torque is provided to an associated wheel assembly. Such a loss of traction may result in unintended spinning of the wheel assembly, which may be referred to as wheel slip. Propulsion torque may be biased toward the slipping wheel when the differential lock is unlocked, which may allow the slipping wheel to continue to spin. Thus, when wheel slip is detected, the differential lock may be actuated to lock the differential assembly so that both axle shafts and their associated wheel assemblies are rotatable together to help reduce spinning and to help gain traction. However, wheel slip alone may not warrant actuating the differential lock the differential assembly. For instance, traction may be regained and wheel slip may stop before the differential assembly can be locked. As another example, data indicative of wheel slip may be inaccurate at startup or when there is limited data available to evaluate whether wheel slip is present. In addition, the differential assembly may not be able to be locked when sufficient synchronization is not attained for a sufficient period of time to engage the differential lock. The method below addresses such issues.

FIG. 2 is described below starting with the differential lock 60 in the disengaged or unlocked position. In addition, the method is described with respect to controlling the differential lock 60 of one axle assembly; however, it is to be understood that the method may be applied to multiple axle assemblies such that each differential lock can be independently controlled.

At block 200, the method monitors and compares the wheel speeds of the axle assembly 20. The wheel speeds may be monitored and compared using the speed sensors 90. For example, the signal from a first speed sensor 90, such as that associated with connection node W1, may be indicative of the rotational speed of a first wheel assembly 22, while a signal from a second speed sensor 90, such as that associated with connection node W2, may be indicative of the rotational speed of a second wheel assembly 22. It is expected that both wheel assemblies will rotate at similar but not necessarily identical speeds in the absence of wheel slip.

At block 202, the method determines whether wheel slip is occurring or is detected. Wheel slip may be determined by comparing the rotational speed of two wheel assemblies 22, such as the rotational speed of a first wheel assembly 22 to the rotational speed of a second wheel assembly 22. The first wheel assembly 22 and the second wheel assembly 22 may be mounted to the same axle assembly 20. Wheel slip may be occurring when the rotational speed of the first wheel assembly 22 is not sufficiently close to the rotational speed of the second wheel assembly 22. As a nonlimiting example, wheel slip may be present when the rotational speed of one wheel assembly 22 is at least twice as fast as another wheel assembly 22. It is also contemplated that wheel slip may also be assessed using a speed sensor 90 of another axle assembly 20 or a speed sensor that is associated with a wheel assembly 22 that is not operatively connected to the differential assembly 32. For instance, it is expected that the rotational speed of all wheel assemblies 22 that are in contact with the road or support surface may rotate at approximately the same rotational speeds when wheel slip is not present. Thus expanding on the previous example, wheel slip may be present when the rotational speed of one wheel assembly 22 is at least twice as fast as the rotational speed of another wheel assembly 22 that is part of another axle assembly, at least twice as fast as an average wheel speed of multiple wheel assemblies 22, or the like. If wheel slip is not detected, then the method may continue at block 204. If wheel slip is detected, then the method may continue at block 206.

At block 204, the differential lock 60 may not be actuated to lock the differential assembly 32 and thus may be kept in the disengaged or unlocked position. The method iteration may end at block 204.

At block 206, the method determines a pre-activation buffer (PAB). The pre-activation buffer may be variable value that may be based on the vehicle speed and wheel acceleration (i.e., acceleration of the wheel assembly that is slipping, which is the rate of change of the rotational speed provided by an associated speed sensor 90). The pre-activation buffer may be calculated or may be determined using a lookup table and may be bounded by maximum and minimum values. As a nonlimiting example, the minimum buffer may be about 0.3 seconds and the maximum buffer may be about 1.2 seconds.

The pre-activation buffer is used to delay engagement of the differential lock 60 or actuation of the differential lock from the unlocked position to the locked position to lock the differential assembly 32. The pre-activation buffer may help ensure that wheel slip is actually occurring. For instance, a false wheel slip condition may be detected when the vehicle is traveling on a paved surface and one wheel encounters an obstacle, such as a curb. As another example, a false wheel slip condition may be detected during low speed vehicle maneuvers, which may be due to misleading signals from a speed sensor 90. Thus, it may be desirable to delay engagement of the differential lock at low vehicle speeds to obtain more confidence that wheel slip is actually occurring. As another example, it may be easier or more likely to regain traction at lower wheel accelerations as compared to higher wheel accelerations or at lower vehicle speeds as compared to higher vehicle speeds. Conversely, it may be harder less likely to regain traction at higher wheel accelerations and/or higher vehicle speeds. Thus, the delay provided by pre-activation buffer may be higher at low vehicle speeds and low wheel accelerations, lower at high vehicle speeds and higher wheel accelerations, and may be associated with intermediate values at low vehicle speeds and high wheel accelerations as well as at high vehicle speeds and low wheel accelerations. As such, the delay provided by the pre-activation buffer may decrease as acceleration and wheel speed of the slipping wheel assembly increases. The method may continue at block 208.

At block 208, the method determines whether the wheel slip duration is greater than the pre-activation buffer (PAB). The wheel slip duration, which may also be referred to as the duration of the wheel slip, may be indicative of the amount of time or length of time that wheel slip has been occurring or detected. If the wheel slip duration does not exceed or is not greater than the pre-activation buffer, then the method may continue at block 210. If the wheel slip duration exceeds or is greater than the pre-activation buffer, then the method may continue at block 212.

At block 210, the method determines whether the wheel speed has been monitored for a first predetermined period of time. This comparison may help better identify whether wheel slip is recurring. For instance, to arrive at block 210, a short duration wheel slip has been detected having a duration that is less than or equal to the pre-activation buffer. Further monitoring may help better interpret the terrain upon which the vehicle 10 is traveling. For instance, short duration wheel slips or smaller number of wheel slips may be more likely on a paved road as compared to muddy terrain. On muddy terrain a short duration wheel slip may occur and may be followed by another wheel slip having a longer duration. Accordingly, this step allows the method to check for longer duration wheel slips (that exceed the pre-activation buffer) for a limited amount of time (i.e. for the first predetermined period of time). The first predetermined period of time may be a constant that may be based on vehicle development testing. As a nonlimiting example, the first predetermined period of time may be a value greater than 10 seconds, such as 60 seconds. If the wheel speed has not been monitored for the first predetermined period of time, then the method may return to block 208. If the wheel speed has been monitored for at least the first predetermined period of time, then the method may continue at block 204 and the differential lock 60 may remain disengaged.

At block 212, the method determines a differential lock engagement buffer (DLEB). The differential lock engagement buffer may be used to delay actuation of the differential lock 60 to lock the differential assembly 32 to help improve the likelihood that the differential lock 60 can be successfully actuated or engaged to lock the differential assembly 32. The differential lock engagement buffer may be based on vehicle speed and wheel acceleration (i.e., acceleration of the wheel assembly that is slipping); however, the differential lock engagement buffer may be more heavily weighted based on vehicle speed. For instance, the differential lock engagement buffer may be greater (longer) at higher vehicle speeds as compared to lower vehicle speeds. Thus, the delay associated with differential lock engagement buffer may be higher at high vehicle speeds and high wheel accelerations, lower at low vehicle speeds and low wheel accelerations, and may be associated with intermediate values at low vehicle speeds and high wheel accelerations as well as at high vehicle speeds and low wheel accelerations. As such, the delay provided by the differential lock engagement buffer may increase as acceleration and wheel speed of the slipping wheel assembly increases. The differential lock engagement buffer may be calculated or may be determined using a lookup table. The method may continue at block 214.

At block 214, the method compares an amount of time associated with a differential lock engagement range to the differential lock actuator buffer. This step evaluates whether the differential lock 60 can be successfully actuated to lock the differential assembly 32 after accommodating the delay associated with the differential lock engagement buffer.

For instance, this step may help determine whether the rotational speed of the differential lock is sufficiently close to the rotational speed of another component, such as the differential case or the other axle shaft 34 of the axle assembly 20, remain close enough for a long enough period of time to permit engagement of the differential lock 60. As an example, the differential lock 60 may be configured as a clutch collar that may rotate with a first axle shaft 34. The differential lock 60 may have teeth that are configured to mesh with corresponding teeth on the differential case 52. The teeth of the differential lock 60 may mesh with teeth of the differential case 52 when the rotational speeds of the differential lock 60 and the differential case 52 are sufficiently close to permit the differential lock 60 to move axially such that the teeth of the differential lock 60 can be inserted into corresponding gaps between the teeth on the differential case 52 and into meshing engagement.

The differential lock engagement range may be based on the rotational speed of each wheel assembly 22 or each axle shaft 34 of the axle assembly 20. For instance, the differential lock 60 may be engageable when the rotational speed of the first wheel assembly 22 and the first axle shaft 34 is sufficiently close to the rotational speed of the second wheel assembly 22 and the second axle shaft 34, such as when the rotational speeds are the same or within ±5% of each other (e.g., rotational speeds within ±5% of each other may result in the differential case 52 and differential lock 60 rotating at speed in which shifting of the differential lock 60 can be successful). The amount of time that the rotational speeds are sufficiently close may be measured by continuing to compare the rotational speeds of the wheel assemblies 22. If the duration or length of the differential lock engagement range exceeds the differential lock actuator buffer or there is sufficient synchronization to actuate the differential lock 60 to lock the differential assembly 32 when the delay associated with differential lock actuator buffer has elapsed, then the method may continue at block 216. Otherwise, then the method may continue at block 218.

At block 216, the method may determine whether the wheel speeds have been monitored for more than a second predetermined period of time. This block may be similar to block 210. This block may help reduce the likelihood that the differential lock 60 is actuated during a transitioning stage in which traction shifts from one wheel assembly 22 of the axle assembly 20 to the other. The second predetermined period of time associated with block 216 may be the same as the first predetermined period of time associated with block 210 or may differ from the first predetermined period of time associated with block 210. The second predetermined period of time may be a constant that may be based on vehicle development testing. As a nonlimiting example, the second predetermined period of time may be a value greater than 10 seconds, such as 60 seconds. If the wheel speeds have not been monitored for the second predetermined period of time, then the method may return to block 214. If the wheel speeds have been monitored for at least the second predetermined period of time, then the method may continue at block 204 and the differential lock 60 may remain disengaged.

At block 218, the differential lock 60 is engaged. The differential lock may be engaged by operating the differential lock actuator 62 to actuate the differential lock 60 from the disengaged or unlocked position to the engaged or locked position to lock the differential assembly 32. It is contemplated that the differential lock 60 may be actuated in anticipation that sufficient synchronization will be present once the differential lock 60 reaches the differential assembly 32. The method may continue at FIG. 3 as represented by flowchart connector symbol B.

Referring to FIG. 3, method steps associated with potential disengagement of the differential lock 60 are shown. These steps may be associated with vehicle speed and at least one period of time.

At block 300, the method may determine whether the vehicle speed exceeds a predetermined speed for at least a first period of time. The predetermined speed may be a constant or variable value. As a nonlimiting example, the predetermined speed may be a constant such as 30 km/h. The first period of time may also be a constant or variable value. For instance, the first period of time may be a constant such as 5 seconds. Accordingly, the step may check to see whether the vehicle speed is exceeded over a first period of time. When the vehicle speed exceeds the predetermined speed for the first period of time, this is indicative that wheel slip is no longer occurring, or the wheel slip that is occurring is not significantly affecting the vehicle speed, or the wheel slip that is occurring is at least not causing the vehicle speed to drop below the predetermined speed. If the vehicle speed exceeds the predetermined speed for at least the first period of time, then the method may continue at block 302. If the vehicle speed does not exceed the predetermined speed for at least the first period of time, then the method may continue at block 304.

At block 302, the differential lock may be disengaged or unlocked. The differential lock may be disengaged by operating the differential lock actuator 62 to actuate the differential lock 60 from the engaged or locked position to the disengaged or unlocked position.

At block 304, the method may determine whether the vehicle is stationary for at least a second period of time. The vehicle may be stationary when the vehicle is not moving, such as when the vehicle speed is 0 km/h. The second period of time may be a constant or variable value and may be the same as the first period of time or may differ from the first period of time. For instance, the second period of time may be greater than the first period of time. As a nonlimiting example, the second period of time may be greater than 30 seconds, such as 60 seconds. The step may check to see whether the vehicle has been parked or has remained stationary such as at a stoplight for a sufficiently long period of time. If the vehicle is stationary for at least the second period of time, then the method may continue at block 302 and the differential lock may be disengaged or unlocked. If the vehicle is not stationary for at least the second period of time, then the method may continue at block 306.

At block 306, the differential lock 60 may be kept in the engaged or locked position.

The system and method described above may allow a differential lock to be automatically controlled rather than manually controlled by the vehicle operator. This may avoid attempts to engage the differential lock when differential locking is not needed or when the differential lock cannot be engaged due to a lack of synchronization, thereby helping improve vehicle drivability and help increase the life of the differential lock in the differential lock actuator. In addition, automatic control may help avoid or eliminate situations in which a vehicle operator forgets to unlock the differential assembly, thereby avoiding unnecessary tire wear and helping increase the life of components of the axle assembly, such as the axle shafts. The system and method may use the same speed sensors as a vehicle antilock brake system, which may allow existing sensors to be used to help reduce cost and complexity.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a differential lock, the method comprising:
   actuating the differential lock to lock a differential assembly when wheel slip of a first wheel assembly is detected and a duration of the wheel slip exceeds a pre-activation buffer, wherein the pre-activation buffer is based on acceleration of the first wheel assembly and vehicle speed.

2. The method of claim 1 further comprising not actuating the differential lock to lock the differential assembly when wheel slip is not detected.

3. The method of claim 1 wherein wheel slip of the first wheel assembly is detected by comparing a rotational speed of the first wheel assembly to a rotational speed of a second wheel assembly.

4. The method of claim 3 wherein there is wheel slip of the first wheel assembly when the rotational speed of the first wheel assembly is at least twice the rotational speed of the second wheel assembly.

5. The method of claim 1 wherein the pre-activation buffer is determined after wheel slip of the first wheel assembly is detected.

6. The method of claim 1 wherein the pre-activation buffer delays actuation of the differential lock to lock the differential assembly and a delay provided by the pre-activation buffer decreases as acceleration of the first wheel assembly and wheel speed increases.

7. The method of claim 1 wherein the differential lock is not actuated to lock the differential assembly when wheel speed of the first wheel assembly has been monitored for a first predetermined period of time and the duration of the wheel slip does not exceed the pre-activation buffer.

8. The method of claim 1 further comprising determining a differential lock engagement buffer when the duration of the wheel slip exceeds the pre-activation buffer.

9. The method of claim 8 wherein actuating the differential lock includes actuating the differential lock to lock the differential assembly when an amount of time that rotational speeds of the first wheel assembly and a second wheel assembly that is connected to the differential assembly are in a differential lock engagement range exceeds the differential lock engagement buffer.

10. The method of claim 9 wherein the differential lock engagement buffer is based on vehicle speed.

11. The method of claim 10 wherein the differential lock engagement buffer is based on acceleration of the first wheel assembly.

12. The method of claim 11 wherein the differential lock engagement buffer delays actuation of the differential lock to lock the differential assembly and a delay provided by the differential lock engagement buffer increases as the vehicle speed increases.

13. The method of claim 11 wherein the differential lock engagement buffer delays actuation of the differential lock to lock the differential assembly and a delay provided by the differential lock engagement buffer increases as acceleration of the first wheel assembly increases.

14. The method of claim 9 wherein the differential lock is not actuated to lock the differential assembly when wheel speed of the first wheel assembly has been monitored for a second predetermined period of time and the amount of time that the rotational speeds of the first wheel assembly and the second wheel assembly are in the differential lock engagement range does not exceed the differential lock engagement buffer.

15. The method of claim 1 further comprising disengaging the differential lock when the vehicle speed exceeds a predetermined speed for a first period of time.

16. The method of claim 1 further comprising disengaging the differential lock when the vehicle speed is zero for a second period of time.

17. The method of claim 1 further comprising disengaging the differential lock when the vehicle speed exceeds a predetermined speed for a first period of time or when a vehicle having the differential assembly and the differential lock is stationary for a second period of time, wherein the first period of time differs from the second period of time.

18. The method of claim 17 wherein the first period of time is less than the second period of time.

19. The method of claim 1 further comprising not disengaging the differential lock when the vehicle speed does not exceed a predetermined speed for a first period of time and the vehicle speed is not zero for a second period of time.

\* \* \* \* \*